(12) United States Patent  
Lee

(10) Patent No.: US 10,333,207 B2  
(45) Date of Patent: Jun. 25, 2019

(54) VEHICLE AND CONTROL METHOD OF CONTROLLING THE SAME

(71) Applicant: HYUNDAI MOTOR COMPANY, Seoul (KR)

(72) Inventor: Byoung Hyun Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 148 days.

(21) Appl. No.: 15/380,359

(22) Filed: Dec. 15, 2016

(65) Prior Publication Data

US 2018/0083347 A1 Mar. 22, 2018

(30) Foreign Application Priority Data

Sep. 20, 2016 (KR) .......................... 10-2016-0119862

(51) Int. Cl.
| | |
|---|---|
| H04M 3/50 | (2006.01) |
| H01Q 1/32 | (2006.01) |
| H04B 3/50 | (2006.01) |
| H04H 40/27 | (2008.01) |
| H04W 4/04 | (2009.01) |
| H04W 4/06 | (2009.01) |
| H04H 20/62 | (2008.01) |

(52) U.S. Cl.
CPC ............. *H01Q 1/3275* (2013.01); *H04B 3/50* (2013.01); *H04H 20/62* (2013.01); *H04H 40/27* (2013.01); *H04W 4/046* (2013.01); *H04W 4/06* (2013.01)

(58) Field of Classification Search
CPC ........ H01Q 1/3275; H04B 3/50; H04H 40/27; H04W 4/046; H04W 4/06

USPC ....................................................... 455/569.2
See application file for complete search history.

(56) References Cited

U.S. PATENT DOCUMENTS

| | | | | |
|---|---|---|---|---|
| 4,788,549 A | * | 11/1988 | Ohe | ..................... H01Q 1/3275 343/712 |
| 5,654,717 A |   | 8/1997  | Nichols et al. | |
| 5,959,581 A | * | 9/1999  | Fusinski | .............. H01Q 1/1271 343/700 MS |
| 6,011,518 A | * | 1/2000  | Yamagishi | ........... H01Q 1/3266 343/700 MS |
| 6,081,515 A | * | 6/2000  | Toivola | ............... H04W 88/085 370/339 |
| 6,236,372 B1 | * | 5/2001  | Lindenmeier | ........ H01Q 1/1271 343/704 |
| 6,515,620 B1 | * | 2/2003  | Jandrell | ................ G01S 5/0018 342/357.64 |

(Continued)

FOREIGN PATENT DOCUMENTS

| | | |
|---|---|---|
| KR | 10-2001-0014963 A | 2/2001 |
| KR | 10-0624844 B1     | 9/2006 |

(Continued)

*Primary Examiner* — Hai V Nguyen
(74) *Attorney, Agent, or Firm* — Morgan, Lewis & Bockius LLP

(57) ABSTRACT

Provided is a vehicle including: an antenna configured to receive at least two external signals from an external device and to output an integrated signal by integrating the at least two external signals; a single feeder cable electrically connected to the antenna and configured to transfer the integrated signal; and a controller electrically connected to the single feeder cable, and separating the integrated signal into at least two signals, and transferring the at least two signals to each module corresponding to each of the at least two signals.

17 Claims, 10 Drawing Sheets

(56) References Cited

U.S. PATENT DOCUMENTS

| | | | | |
|---|---|---|---|---|
| 6,697,019 B1* | 2/2004 | Hyuk-Joon | H01Q 1/3275 | 343/700 MS |
| 6,879,294 B2* | 4/2005 | Yuanzhu | H01Q 1/12 | 343/713 |
| 6,882,309 B2* | 4/2005 | Bromley | G01S 5/0018 | 342/357.64 |
| 6,897,815 B2* | 5/2005 | Goto | H01Q 1/243 | 343/702 |
| 6,943,741 B2* | 9/2005 | Bally | H01Q 1/1271 | 343/711 |
| 7,286,098 B2* | 10/2007 | Ogino | H01Q 1/1271 | 343/700 MS |
| 7,463,980 B2* | 12/2008 | Hoiness | G01S 19/35 | 342/357.75 |
| 7,471,240 B2* | 12/2008 | Kondo | G01S 19/36 | 340/908 |
| 7,511,675 B2* | 3/2009 | Puente-Baliarda | H01Q 1/1271 | 343/713 |
| 7,587,183 B2* | 9/2009 | Duzdar | H04B 1/0064 | 375/345 |
| 7,623,080 B2* | 11/2009 | Ogino | H01Q 7/00 | 343/704 |
| 7,650,173 B2* | 1/2010 | Samavati | G01S 19/36 | 455/277.1 |
| 7,671,791 B2* | 3/2010 | Feller | G01S 19/07 | 342/357.27 |
| 7,671,814 B2* | 3/2010 | Savage | H01Q 1/2233 | 343/719 |
| 7,720,434 B2* | 5/2010 | Yegin | H04B 1/18 | 343/713 |
| 7,898,488 B2* | 3/2011 | Takemura | H01Q 1/2208 | 343/741 |
| 7,994,994 B2* | 8/2011 | Savage | H01Q 1/2233 | 343/719 |
| 8,111,196 B2* | 2/2012 | Thiam | H01Q 9/0414 | 343/700 MS |
| 8,284,107 B2* | 10/2012 | Borisov | H01Q 1/2233 | 29/600 |
| 8,299,975 B2* | 10/2012 | Savage | H01Q 1/2233 | 343/719 |
| 8,462,060 B2* | 6/2013 | Savage | H01Q 1/2233 | 343/719 |
| 8,560,041 B2* | 10/2013 | Flaherty | A61B 5/0031 | 600/372 |
| 8,994,598 B2* | 3/2015 | Ogino | H01Q 1/1271 | 343/713 |
| 9,014,975 B2* | 4/2015 | Brashear | G01C 21/165 | 701/472 |
| 9,438,292 B2* | 9/2016 | Sugimoto | H04B 1/3822 | |
| 9,590,664 B2* | 3/2017 | Rexberg | H04B 1/0475 | |
| 2003/0197651 A1* | 10/2003 | Yuanzhu | H01Q 1/12 | 343/725 |
| 2004/0116084 A1* | 6/2004 | Ward | H01Q 23/00 | 455/130 |
| 2005/0052334 A1* | 3/2005 | Ogino | H01Q 1/1271 | 343/866 |
| 2006/0173259 A1* | 8/2006 | Flaherty | A61B 5/0031 | 600/331 |
| 2006/0205369 A1* | 9/2006 | Schaich | H01Q 1/32 | 455/132 |
| 2007/0120756 A1* | 5/2007 | Ogino | H01Q 1/1271 | 343/713 |
| 2007/0182626 A1* | 8/2007 | Samavati | G01S 19/36 | 342/357.57 |
| 2008/0146176 A1* | 6/2008 | Duzdar | H04B 1/0064 | 455/136 |
| 2010/0117921 A1* | 5/2010 | Choi | H04B 1/005 | 343/876 |
| 2010/0231468 A1* | 9/2010 | Ogino | H01Q 1/1271 | 343/713 |
| 2010/0289710 A1* | 11/2010 | Ogino | H04L 12/4633 | 343/713 |
| 2011/0079427 A1* | 4/2011 | Powale | H01B 3/427 | 174/72 A |
| 2013/0004179 A1* | 1/2013 | Nielsen | H04B 3/50 | 398/115 |
| 2015/0065067 A1* | 3/2015 | Sugimoto | H04B 1/3822 | 455/90.1 |
| 2016/0282457 A1* | 9/2016 | Mazzaro | G01S 13/106 | |
| 2017/0294708 A1* | 10/2017 | Lee | H01Q 1/3275 | |

FOREIGN PATENT DOCUMENTS

| | | |
|---|---|---|
| KR | 10-0786112 B1 | 12/2007 |
| KR | 10-2010-0043133 A | 4/2010 |
| KR | 10-2013-0107951 A | 10/2013 |
| KR | 10-1496178 B1 | 2/2015 |
| KR | 10-2015-0095114 A | 8/2015 |

* cited by examiner

FIG.8

| TABLE | BEFORE INTEGRATION OF FILTER AND FEEDER CABLE | | AFTER INTEGRATION OF FILTER AND FEEDER CABLE |
|---|---|---|---|
| | GPS | BROADCAST COMMUNICATION | GPS /BROADCAST COMMUNICATION |
| PHANTOM POWER AND CURRENT | 5V/50mA | 12V/100mA | 5V/150mA |
| LDO | 5V→4V | 12V→4V | 5V→4V |
| LNA | 4V | 4V | 4V |

FIG.9

|  | BEFORE INTEGRATION OF FILTER AND FEEDER CABLE | | AFTER INTEGRATION OF FILTER AND FEEDER CABLE |
| --- | --- | --- | --- |
|  | GPS POWER SUPPLY | BROADCAST COMMUNICATION POWER SUPPLY | GPS /BROADCAST COMMUNICATION INTEGRATION POWER |
| GPS SIGNAL RECEPTION | ON | OFF | ON |
| BROADCAST COMMUNICATION SIGNAL RECEPTION | OFF | ON | ON |

VEHICLE AND CONTROL METHOD OF CONTROLLING THE SAME

CROSS-REFERENCE TO RELATED APPLICATION(S)

This application claims the benefit of priority to Korean Patent Application No. 10-2016-0119862, filed on Sep. 20, 2016 in the Korean Intellectual Property Office, the disclosure of which is incorporated herein by reference.

TECHNICAL FIELD

The present disclosure relates to a vehicle and a method of controlling the vehicle.

BACKGROUND

A vehicle antenna represents a device configured to transmit and receive radio signals so that a broadcast communication transceiver mounted inside of a vehicle performs a wireless communicate with outside.

The vehicle antenna is physically connected to a head unit of the vehicle via a feeder cable. Therefore, the antenna and the head unit may send and receive a signal or receive a power via the feeder cable.

Since the feeder cable is relatively expensive, it is necessary to reduce the number of the feeder cable to reduce the manufacturing cost while it is necessary to ensure that communication performance between the vehicle antenna and the head unit in the vehicle is maintained even when there is the reduction of the number of the feeder cable.

SUMMARY

An aspect of the present disclosure provides a vehicle capable of receiving a plurality of signals via an antenna unit, integrating the signals, and transmitting the integrated signal to a controller via a single feeder cable, and a method of controlling the same.

Another aspect of the present disclosure provides a vehicle capable of separating a signal transmitted to a controller via a single feeder cable and transmitting the separated signal to a module corresponding to the separated signal, and a method of controlling the same.

Additional aspects of the present disclosure will be set forth in part in the description which follows and, in part, will be obvious from the description, or may be learned by practice of the present disclosure.

In accordance with an exemplary embodiment of the present disclosure, a vehicle includes: an antenna configured to receive at least two external signals from an external device and to output an integrated signal by integrating the at least two external signals; a single feeder cable electrically connected to the antenna and configured to transfer the integrated signal; and a controller electrically connected to the single feeder cable, separating the integrated signal into at least two signals, and transferring the at least two signals to each module corresponding to each of the at least two signals.

The single feeder cable may connect a port of the antenna to a port of the controller and transfer the integrated signal between the antenna and the controller.

The antenna may include a first external signal reception module configured to receive a first external signal and a second external signal reception module configured to receive a second external signal that is different from the first external signal.

The antenna may include a first amplifier configured to amplify the first external signal received from the first external signal reception module and a second amplifier configured to amplify the second external signal received from the second external signal reception module.

The vehicle may further include a power supplier configured to supply power to the first amplifier and the second amplifier via the single feeder cable.

The power supplier may supply the same voltage to the first amplifier and the second amplifier.

The antenna may include a signal integration filter configured to generate the integrated signal by integrating the amplified first external signal and the amplified second external signal.

The signal integration filter may include a high pass filter and a low pass filter.

The controller may include a signal separation filter configured to separate the integrated signal generated by the signal integration filter into a signal corresponding to the amplified first external signal and a signal corresponding to the amplified second external signal, and to transfer each of the signal to each module corresponding to each of the signal.

The signal separation filter may include a high pass filter and a low pass filter.

The at least two signals may include at least one of a broadcast communication signal and GPS signals.

In accordance with another exemplary embodiment of the present disclosure, a method of controlling a vehicle includes: receiving, by an antenna, at least two external signals from an external device; outputting, by the antenna, an integrated signal by integrating the at least two external signals; transferring, by a controller, the integrated signal via a single feeder cable; separating, by the controller, the integrated signal received via the single feeder cable into at least two signals; and transferring, by the controller, the at least two signals to each module corresponding to each of the at least two signals.

The single feeder cable may connect a connection port of the antenna to a connection port of the controller.

The transferring the integrated signal via the single feeder cable may include comprise transmitting the integrated signal including a RF signal.

The receiving at least two external signal from the external device may include receiving a first external signal and receiving a second external signal that is different from the first external signal.

The outputting the integrated signal by integrating the at least two external signals may include amplifying the first external signal and amplifying the second external signal.

The outputting the integrated signal by integrating the at least two external signals may include generating the integrated signal by integrating the amplified first external signal and the amplified second external signal.

The separating the integrated signal received via the single feeder cable into at least two signals and the transferring the at least two signal to each module corresponding to each of the at least two signals may include separating the integrated signal into a signal corresponding to the amplified first external signal and a signal corresponding to the amplified second external signal; and transferring each of the signal to each module corresponding to each of the signal.

The method of controlling a vehicle may further include supplying power via the single feeder cable.

The at least two signals may include at least one of a broadcast communication signal and GPS signals.

BRIEF DESCRIPTION OF THE DRAWINGS

These and/or other aspects of the disclosure will become apparent and more readily appreciated from the following description of embodiments, taken in conjunction with the accompanying drawings of which:

FIG. 8 is a table illustrating a difference between the plurality of feeder cables connection method and the signal feeder cable connection method in accordance with the embodiment of the present disclosure;

FIG. 9 is a table illustrating a process of supplying power according to the signal feeder cable connection method in accordance with the embodiment of the present disclosure.

DETAILED DESCRIPTION

The present disclosure will be described more fully hereinafter with reference to the accompanying drawings, in which exemplary embodiments of the disclosure are shown.

Hereinafter a vehicle and a control method thereof according to an embodiment will be described with reference to FIGS. 1 to 10.

Figure 1:
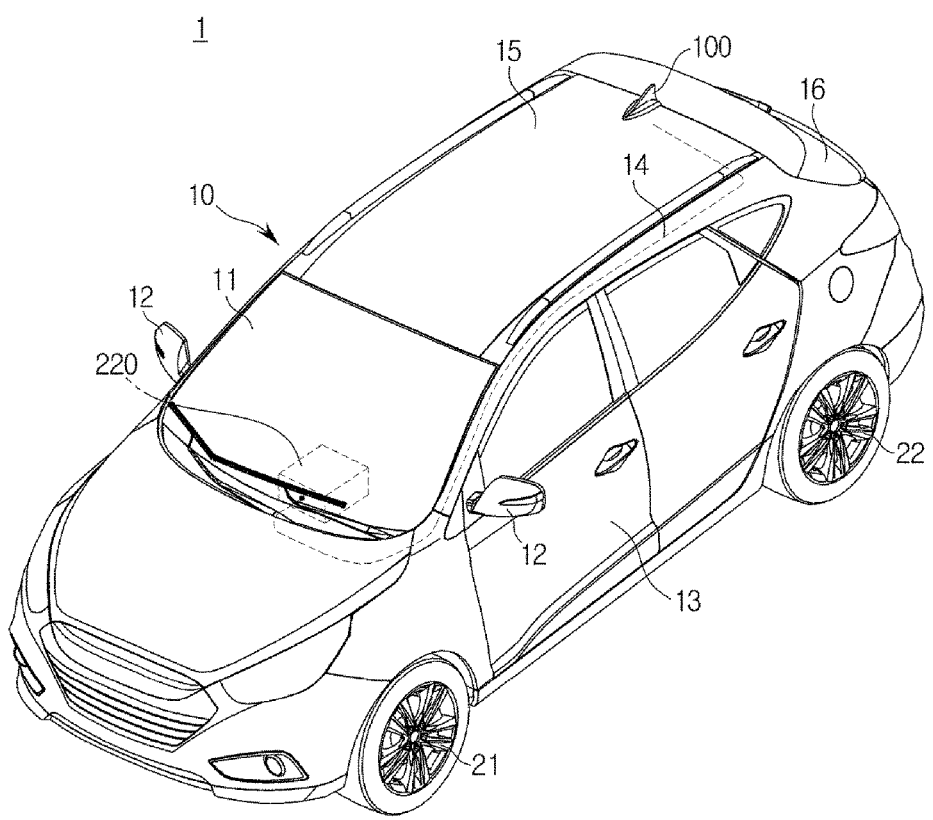
FIG. 1 is a view illustrating an exterior of a vehicle in accordance with an embodiment of the present disclosure.
Figure 2:
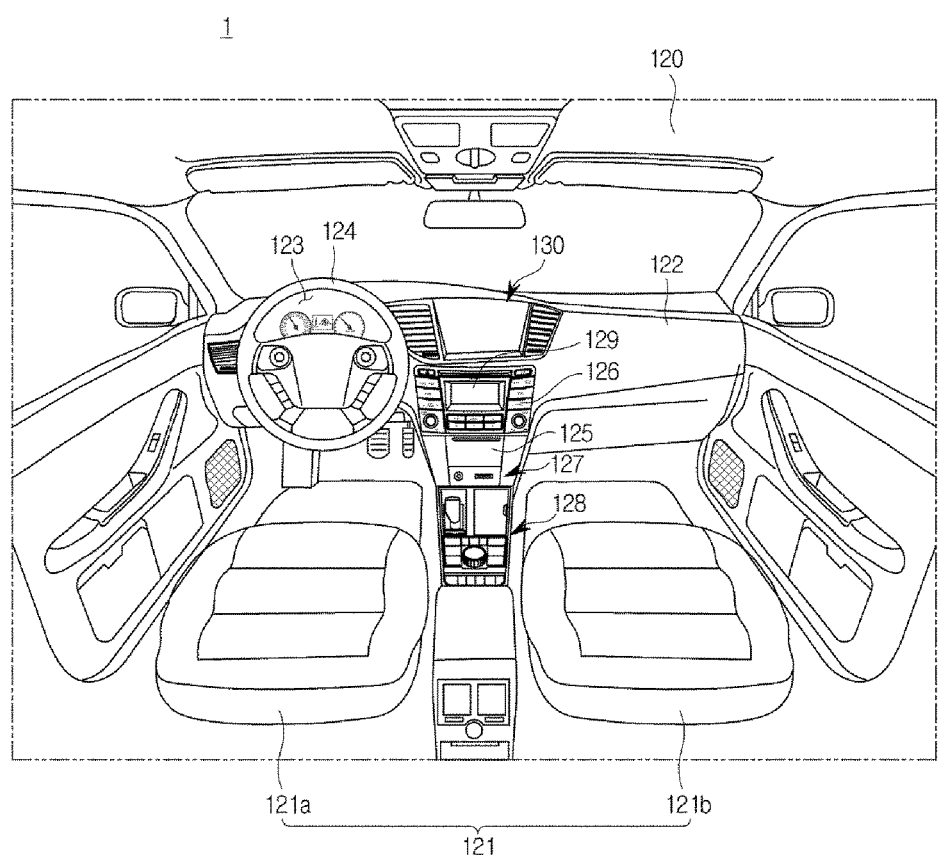
FIG. 2 is a view illustrating an interior of the vehicle in accordance with the embodiment of the present disclosure.

FIG. 1 is a view illustrating an exterior of a vehicle in accordance with an embodiment of the present disclosure, and FIG. 2 is a view illustrating an interior of the vehicle in accordance with the embodiment of the present disclosure.

Referring to FIG. 1, a vehicle 1 may include a body 10 forming an exterior of the vehicle 1, a windscreen 11 providing a front view of the vehicle 1 to a driver, a side mirror 12 providing a rear view of the vehicle 1 to a driver, a door 13 closing the inside of the vehicle 1 from the outside, a front wheel 21 provided in the front side of the vehicle 1, and a rear wheel 22 provided in the rear side of the vehicle 1, wherein the front wheel 21 and the rear wheel 22 may be generally referred to as a vehicle wheel.

The windscreen 11 may be disposed on an upper portion of the front of the body 10 to allow a driver inside the vehicle 1 to acquire visual information about the front of the vehicle 1. The side mirror 12 may include a left side mirror provided on the left side of the body 10 and a right side mirror provided on the right side of the body 10, and may allow a driver inside the vehicle 1 to acquire visual information of the lateral side and the rear side of the vehicle 1.

The door 13 may be rotatably disposed on a right side and a left side of the body 10. When the door 13 is opened, a driver may be allowed to be seated in the vehicle 1, and when the door 13 is closed, the inside of the vehicle 1 may be closed from the outside.

The vehicle 1 may further include an antenna unit 100 provided in a roof panel, and receiving at least one of a radio signal, a broadcast signal and a satellite signal, and transmit and receive a signal to and from another vehicle, Intelligence Transportation System (ITS) server and a base station. The antenna unit 100 may represent a signal receiver receiving a plurality of signals from an external device. Further, the antenna unit 100 may be defined as an antenna apparatus.

The antenna unit 100 may be mounted to the exterior of the vehicle 1. Particularly, since the antenna unit 100 is implemented to be compact and a low position, the antenna unit 100 may be mounted on the roof panel 15, and a front panel, but is not limited thereto.

The antenna unit 100 may be integrally implemented with a hot wire in a rear side of the roof panel 15, i.e., in an upper side of a rear window glass 16. In addition, when the antenna unit 100 is installed on the roof panel 15, the antenna unit 100 may be a micro pole type antenna or a shark fin type antenna. However, an antenna illustrated in FIG. 1 is an example of the antenna unit 100 having an exterior of shark fin antenna.

The antenna unit 100 may be connected to an audio/video/navigation (AVN) device 130 provided in the inside of the vehicle 1, and configured to provide an audio function, a video function, and a TV function as well as route guide information according to user's operation command. In addition, the antenna unit 100 may transmit and receive a variety of signal to and from a controller 220 configured to perform an overall control of the vehicle 1. The antenna unit 100 may receive at least one of Radio frequency (RF) signal, AM/FM signal, DBM signal, LTE/3G signal, GPS signals, SXM signal, DAB signal, eCall signal, GNSS signal, and Baidu signal. The rest of the signal excluding the GPS signals may be defined as a broadcast signal.

The controller 220 may transmit a signal received from the antenna unit 100 to at least one of a variety of devices and modules in the vehicle 1 in the form of an electrical signal. In addition, the controller 220 may distribute a signal to devices in the vehicle 1 and also the controller 220 may transmit a signal, which is related to a control command of devices in the vehicle 1, to each device. Although it is referred to as the control unit 220, this is an expression for being interpreted in a broad sense, but not limited thereto. The signal may be transmitted or received via a single feeder cable 14 physically connecting the controller 220 to the antenna unit 100 and functioning as a passage of signal transmission and reception or as a power supply passage.

In the conventional vehicle, a plurality of feeder cables may be provided so that a plurality of signals received via the antenna unit 100 is transmitted to a module in the vehicle corresponding to the each signal. Since the cost of the material of the feeder cable is relatively expensive and a plurality of feeder cables is needed, there may be difficulty in arranging wiring in the vehicle due to the plurality of feeder cables.

When the plurality of feeder cables is integrated to the single feeder cable 14, it may be possible to avoid a complicated wiring and to reduce the cost of the manufacturing of the vehicle. In addition, when using the single feeder cable 14 instead of using the plurality of feed cables, it is required that a plurality of signals is transmitted to each module via a single cable.

As mentioned above, the antenna unit 100 may be needed to integrate a plurality of signals and then transmit the integrated signal to the controller 220, and the antenna unit 100 may separate the integrated signal and then transmit the separated signal to each module. Therefore, when the single feeder cable 14 is used to integrate or separate the plurality of signals, a signal integration filter or a signal separation filter may be needed. An insertion loss, which is generated due to adding the filter, may be compensated by a gain of an amplifier 103 of the antenna unit 100.

The antenna unit 100 and the controller 220 may transmit and receive a signal with each other using the single feeder cable 14, and supply or receive power. A process of transmitting and receiving a signal to and from each module and a process of supplying power to the each module by using the single feeder cable 14 will be described later with reference to FIGS. 6 and 7.

The antenna unit 100 may receive power from a power supplier 240 via the single feeder cable 14. In addition, the controller 220 may receive a signal from the antenna unit 100.

Accordingly, the antenna unit 100 and the controller 220 may transmit and receive an external signal or receive power via the single feeder cable 14. Here, the process of transmitting and receiving a signal and the process of supplying power via the single feeder cable 14 may be selectively performed. A detail description thereof will be described later with reference to FIGS. 6 and 7.

Referring to FIG. 2, the interior 120 of the body may include: seats 121, 121a, and 121b on which a passenger is seated; a dashboard 122; an instrument panel 123, i.e. a cluster; a steering wheel 124 to change the direction of the vehicle; and a center fascia 125 in which an operation panel of an audio device and an air conditioning device is installed. The instrument panel 123 may be disposed on the dashboard 122 and may include tachometer, speedometer, coolant temperature indicator, fuel indicator, turn signal indicator, high beam indicator light, warning light, seat belt warning light, trip odometer, odometer, automatic transmission selector lever indicator, door open warning light, oil warning light, and a low fuel warning light.

The seat 121 may include a driver seat 121a on which a driver is seated, a passenger seat 121b on which a passenger is seated, and a rear seat provided in a rear side of the inside of the vehicle.

The cluster 123 may be implemented in a digital manner. The cluster 123 in the digital manner may display vehicle information and driving information as an image.

The center fascia 125 may be disposed between the driver seat 121a and the passenger seat 121b on the dashboard 122, and may include a head unit 126 configured to control the audio device, the air conditioning device and a hot-wire in the seat.

The head unit 126 may include a plurality of buttons to receive an input of an operation command for the audio device, the air conditioning device, and the hot-wire in the seat.

In the center fascia 125, an air outlet, a cigar jack, and a multi-terminal 127 may be installed.

The multi-terminal 127 may be disposed adjacent to the head unit 126, and may include a USB port, an AUX terminal, and further include a SD slot.

The vehicle 1 may further include an input 128 configured to receive an operation command of a variety of functions, and a display unit 129 configured to display information related to a function currently performed, and information input by a user.

A display panel of the display unit 129 may employ Light Emitting Diode (LED) panel, Organic Light Emitting Diode (OLED) panel or Liquid Crystal Display (LCD) panel.

The input 128 may be disposed on the head unit 126 and the center fascia 125, and may include at least one physical button such as an On/Off button for operation of the variety of functions, and a button to change a set value of the variety of functions.

The input 128 may transmit an operation signal of the button to an electronic control unit (ECU) and the controller 220 in the head unit 126 or the AVN device 130.

The input 128 may include a touch panel integrally formed with the display of the AVN device 130. The input 128 may be activated and displayed in the shape of the button, on the display of the AVN device 130, and may receive an input of the location information of the button displayed.

The input 128 may further include a jog dial (not shown) or a touch pad to input a command for moving cursor and selecting cursor, wherein the cursor is displayed on the display of the AVN device 130. The jog dial or touch pad may be provided in the center fascia.

Particularly, the input 128 may be capable of receiving any one of input of a manual driving mode, in which a driver directly drives a vehicle, and an autonomous driving mode, and may transmit an input signal of the autonomous driving mode to the ECU when the autonomous driving mode is input.

When a navigation function is selected, the input 128 may receive an input of information related to the destination, transmit the input information related to the destination to the AVN device 130, and when a DMB function is selected, the input 128 may receive an input of information related to the channel and sound volume, and transmit the input information related to the channel and sound volume to the AVN device 130.

The AVN device 130 configured to receive information from a user and to output a result corresponding to the input information may be provided in the center fascia 125.

The AVN device 130 may perform at least one function of a navigation function, a DMB function, an audio function, and a video function, and may display information related to the road condition and the driving during the autonomous driving mode.

The AVN device 130 may be installed on the dash board to be vertically stood.

The chassis of the vehicle may further include a power system, a power train, a steering system, a brake system, a suspension system, a transmission device, a fuel system and front, rear, left and right vehicle wheels. The vehicle may further include a variety of safety devices for a driver and passenger safe.

The safety devices of the vehicle may include a variety of safety devices, such as an air bag control device for the safety of the driver and passenger when the collision of the vehicle, and an electronic stability control (ESC) configured to maintain the stability of the vehicle when accelerating or cornering.

The vehicle 1 may further include a detection device, e.g. a proximity sensor configured to detect an obstacle or another vehicle placed in the rear side or the lateral side of the vehicle; a rain sensor configured to detect whether to rain or an amount of rain; a wheel speed sensor configured to detect the wheel of the vehicle; a lateral acceleration sensor configured to detect a lateral acceleration of the vehicle; a yaw rate sensor and a gyro sensor configured to detect the variation of angular speed of the vehicle; and a steering angle sensor configured to detect a rotation of a steering wheel of the vehicle.

The vehicle 1 may include an electronic control unit (ECU) configured to control an operation of the power system, the power train, the driving device, the steering system, the brake system, the suspension system, the transmission device, the fuel system, the variety of safety devices, and the variety of sensors. A detail description of an electronic device will be described later with reference to FIG. 3.

The vehicle 1 may selectively include an electronic device such as a hand-free device, a GPS, an audio device, a bluetooth device, a rear camera, a device for charging terminal device, and a high-pass device, which are installed for the convenience of the driver.

The vehicle 1 may further include an ignition button configured to input an operation command to an ignition motor (not shown).

That is, when the ignition button is turned on, the vehicle 1 may turn on an ignition motor (not shown) and drive an engine (not shown) that is the power generation device, by the operation of the ignition motor.

The vehicle 1 may further include a battery (not shown) configured to supply a driving power by being electrically connected to a terminal device, an audio device, an interior lamp, an ignition motor and other electronic device. The battery may perform a charging by using a generator itself or power from an engine, while the vehicle drives.

Figure 3:
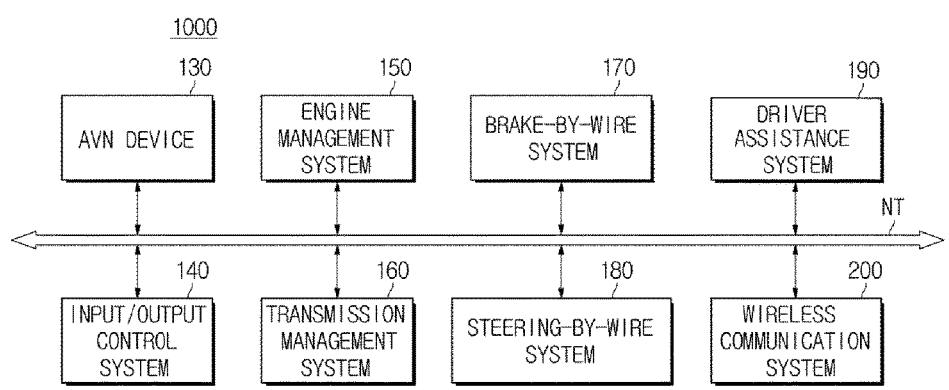
FIG. 3 is a view illustrating an electronic device included in the vehicle in accordance with the embodiment of the present disclosure.

FIG. 3 is a view illustrating an electronic device included in the vehicle in accordance with the embodiment of the present disclosure.

The vehicle 1 may include: a power system (not shown) configured to generate power to move the vehicle 1; a power train (not shown) configured to transmit the power generated in the power system (not shown) to the vehicle wheel; a steering system (not shown) configured to control a moving direction of the vehicle 1; a brake system (not shown) configured to stop a rotation of the vehicle wheel; a suspension system (not shown) configured to reduce a vibration of the vehicle 1; and an electric device 1000 configured to electrically control each component included in the vehicle 1.

The power system may include an engine, a fuel device, a cooling device, an exhaust system, and an ignition system, and the power train may include a clutch, a transmission, a differential device gear and a drive shaft.

The steering system may include a steering wheel; a steering gear; and a steering link. The brake system may include a brake disk; a brake pad; and a master cylinder. The suspension system may include a shock absorber.

The vehicle 1 may include a variety of electric devices 1000 as well as the above mentioned mechanical devices.

Particularly, as illustrated in FIG. 3, the vehicle 1 may include: the AVN device 130; an input/output control system 140; an engine management system (EMS) 150; a transmission management system (TMS) 160; a brake-by-wire system 170; a steering-by-wire system 180; a driver assistance system (DAS) 190; and a wireless communication system 200. The electric device 1000 illustrated in FIG. 3 are a part of the electric device included in the vehicle 1, and thus more various electric devices may be installed in the vehicle 1. In addition, the vehicle 1 may not include all of the electric devices 1000 illustrated in FIG. 3, and thus, some of the electric device 1000 may be omitted.

A variety of the electric device 1000 included in the vehicle 1 may communicate with each other via a vehicle communication network (NT). The vehicle communication network (NT) may employ a communication standard, e.g. media oriented systems transport (MOST) having a maximum communication speed of 24.5 (Mega-bits per second) Mbps, FlexRay having a maximum communication speed of 10 Mbps, controller area network (CAN) having a communication speed of 125 (kilo-bits per second) kbps to 1 Mbps, and local interconnect network (LIN) having a communication speed of 20 kbps. The vehicle communication network (NT) may employ a single communication standard, e.g. MOST, FlexRay, CAN, and LIN, but also may employ a plurality of communication standards.

The AVN device 130 may be a kind of apparatus configured to output music or an image in response to a user's control command. Particularly, the AVN device 130 may play music or a video or guide a route to a destination in response to a user's control command.

The input/output control system 140 may receive a user's control command via a button, and display information corresponding to the user's control command. The input/output control system 140 may include a cluster display disposed on the dash board and configured to display a vehicle speed, a RPM, and an amount of lubrication, and a wheel button module installed in the steering wheel.

The engine management system (EMS) 150 may perform a fuel injection control, an air-fuel ratio feedback control, lean combustion control, an ignition timing control and an idling speed control. The engine control system 150 may not only be a single device, but also a plurality of devices connected to each other via a communication.

The transmission management system (TMS) 160 may perform a shift point control, a damper clutch control, a pressure control when a friction clutch is turned on/off and an engine torque control during shifting. The TMS 160 may not only be a single device, but also a plurality of devices connected to each other via a communication.

The brake-by-wire system 170 may control braking of the vehicle 1, and may include Anti-lock Brake System (ABS).

The steering-by-wire system 180 may assist a driver's steering operation by reducing a steering force during driving at a low-speed or parking, and by increasing the steering force during driving at high-speed.

The driver assistance system (DAS) 190 may assist the driving of the vehicle 1 and may perform a forward collision avoidance function, a lane departure warning function, a blind spot detection function, and a rear detection function.

The driver assistance system (DAS) 190 may include a plurality of devices that is connected via a communication. For example, the driver assistance system (DAS) 190 may include forward collision warning system (FCW), advanced emergency braking system (AEBS), adaptive cruise control (ACC), lane departure warning system (LDWS), lane keeping assist system (LKAS), blind spot detection (BSD) and rear-end collision warning system (RCW).

The wireless communication system 200 may communicate with an external vehicle, an external terminal or a communication relay device.

The wireless communication system 200 may transmit and receive a signal by using a variety of communication protocols. For example, the wireless communication system 200 may employ 2G communication method, e. g. time division multiple access (TDMA) and code division multiple access (CDMA), 3G communication method, e. g. wide code division multiple access (WCDMA), code division multiple access (CDMA) 2000, wireless broadband (Wibro), and world interoperability for microwave access (WiMAX), and 4G communication method, e. g. long term evolution (LTE) and wireless broadband evolution. In addition, the wireless communication system 200 may employ 5G communication method. The wireless communication system 200 may include an internal communication unit 210 and a wireless communication unit 230.

Figure 4:
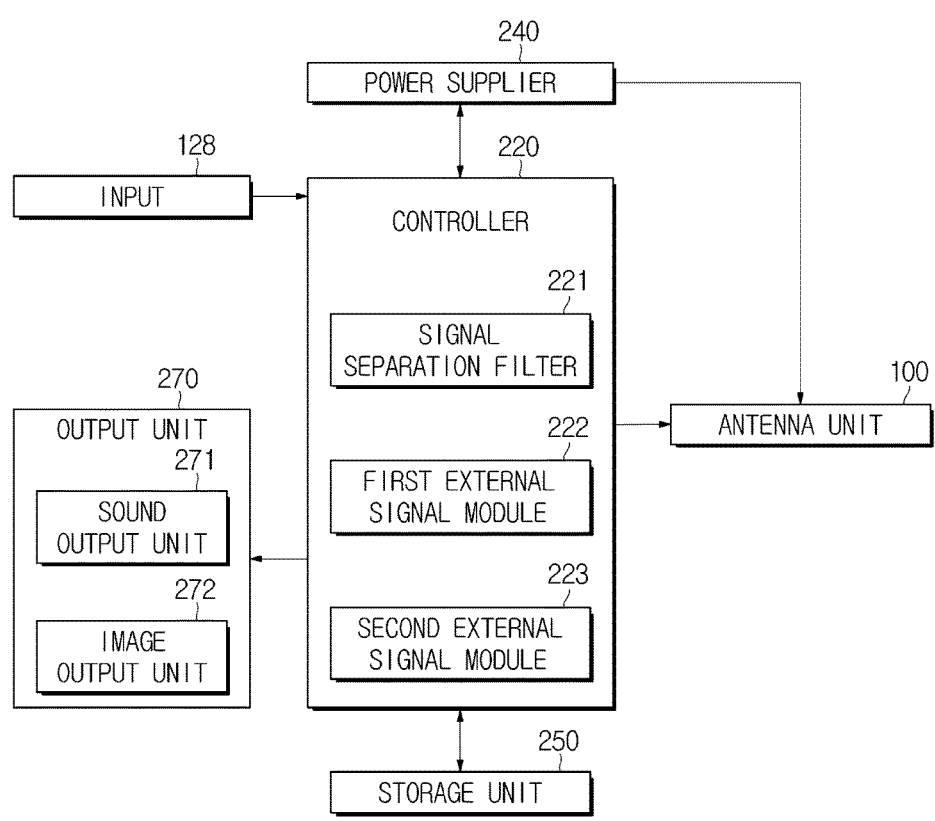
FIG. 4 is a block diagram illustrating a configuration of the vehicle in accordance with the embodiment of the present disclosure.
Figure 5:
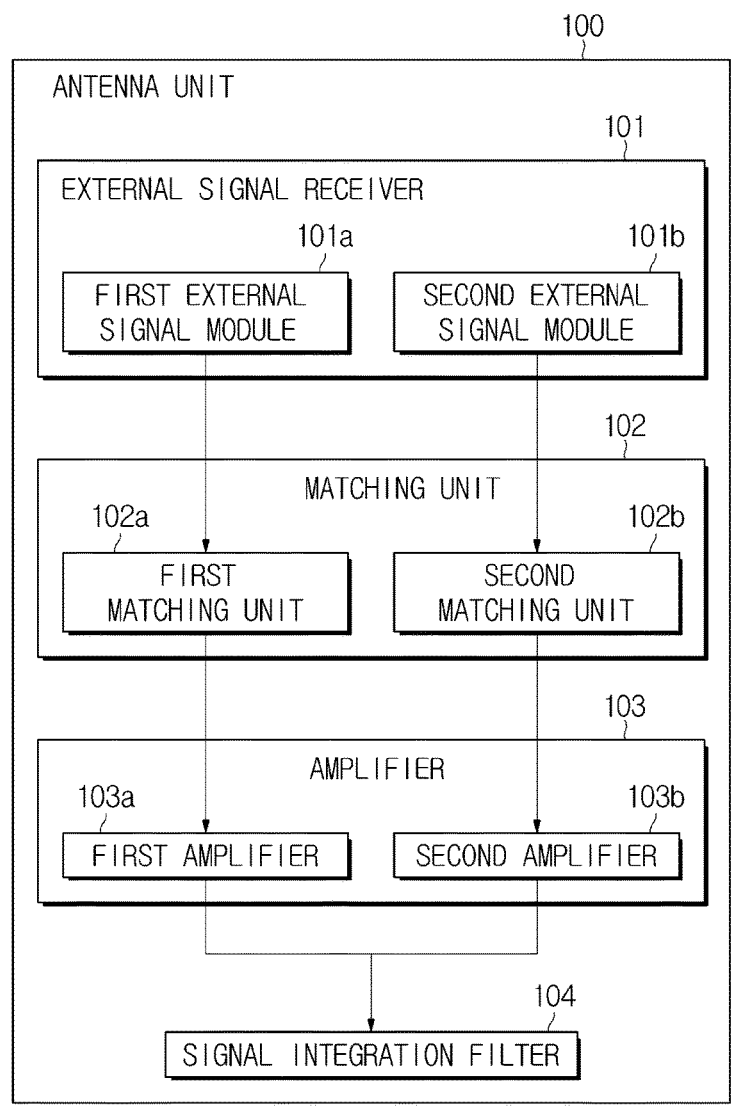
FIG. 5 is a block diagram illustrating a configuration of an antenna unit in accordance with the embodiment of the present disclosure.

FIG. 4 is a block diagram illustrating a configuration of the vehicle in accordance with the embodiment of the present disclosure. In addition, FIG. 5 is a block diagram illustrating a configuration of an antenna unit in accordance with the embodiment of the present disclosure. Hereinafter, the configuration of the vehicle and the antenna unit will be described in details with reference to FIGS. 4 and 5.

The vehicle 1 may include: the input 128; the antenna unit 100; the controller 220; the power supplier 240; a storage unit 250; and an output unit 270. In addition, the vehicle 1 may further include the single feeder cable 14 configured to physically connect the antenna unit 100 and the controller 220 and configured to function as a passage of the plurality of signals and a power supply passage.

By the input 128, a user may input a command configured to control the plurality of the electric device 1000 included in the vehicle 1 or a command configured to control a component included in the vehicle 1. A description of the input 128 is described in FIG. 2, and thus a description thereof will be omitted.

The antenna unit 100 may include an external signal receiver 101, a matching unit 102, an amplifier 103, and a signal integration filter 104.

The antenna unit 100 may receive at least two signals of external signals from an external device. The at least two external signals may include at least one of a broadcast communication signal and GPS signals. The external device may represent all kinds of devices capable of transmitting and receiving a signal, e.g. an external server, a satellite and a communicable terminal.

The antenna unit 100 may generate an integrated signal by integrating at least two external signals received from the external device. For example, GPS signals and broadcast communication signal may be integrated with each other without being affected to each other, and thus, a single integrated signal may be generated. The above mentioned process may be intended to transmit a signal using the single feeder cable instead of the plurality of feeder cables.

In general, the antenna unit 100 may include a signal reception module corresponding to a plurality of signals, and the signal reception module may be connected to each signal module of the controller 220 via the plurality of feeder cables. Therefore, the plurality of feeder cables may be needed to transmit and receive the plurality of signals between the antenna unit 100 and the controller 220. However, when transmitting the plurality of signal to each module such that the plurality of signals is integrated, transmitted, and then separated, it may be possible to transmit and receive a signal using the single feeder cable 14.

The single feeder cable 14 may be physically and electrically connected to the antenna unit 100, and transmit an integrated signal to the controller 220. Further, the single feeder cable 14 may transfer power supplied from the power supplier 240 to the amplifier 103 of the antenna unit 100.

The single feeder cable 14 may physically connect a connection port provided in the antenna unit 100 to a connection port provided in the controller 220. The antenna unit 100 and the controller 220 may transmit and receive an integrated signal with each other via the single feeder cable 14.

In addition, the antenna unit 100 may output an integrated signal to the controller 220 via the single feeder cable 14.

The external signal receiver 101 may include a first external signal reception module 101*a*, and a second external signal reception module 101*b*. However, the external signal receiver 101 including the first external signal reception module 101*a*, and the second external signal reception module 101*b* is for the convenience of the description, and thus, the external signal receiver 101 may include large number of the signal reception module as well as the first external signal reception module 101*a* and the second external signal reception module 101*b*. The external signal receiver 101 may receive a plurality of signals transmitted from an external device. As mentioned above, the plurality of external signals may represent all kinds of signals received from an external device and include at least one of RF signal, GPS signals and broadcast communication signal.

The first external signal reception module 101*a* may receive a first external signal from an external device, wherein the first external signal is defined as GPS signals. The first external signal reception module 101*a* may transfer the first external signal received from the external device to a first matching unit 102*a* of the matching unit 102 in the form of an electrical signal.

The second external signal reception module 101*b* may receive a second external signal from an external device, wherein the second external signal is defined as a broadcast communication signal. The second external signal reception module 101*b* may transfer the second external signal received from the external device to a second matching unit 102*b* of the matching unit 102 in the form of an electrical signal.

The matching unit 102 may electrically connect the external signal receiver 101 and the matching unit 102, and include at least one of a variable inductor and a variable capacitor. The matching unit 102 may match an impedance of the external signal receiver 101 with an impedance of the amplifier 103.

Further, the matching unit 102 may include the first matching unit 102*a* and the second matching unit 102*b*.

The first matching unit 102*a* may match an impedance of the first external signal reception module 101*a* with an impedance of a first amplifier 103*a*. In addition, the second matching unit 102*b* may match an impedance of the second external signal reception module 101*b* with an impedance of a second amplifier 103*b*.

The amplifier 103 may amplify an external signal received from an external device by the external signal receiver 101. The amplifier 103 may include the first amplifier 103*a* and the second amplifier 103*b*. The amplifier 103 may include a low noise amplifier (LNA), and amplifies a weak signal received by the external signal receiver 101 and remove a noise included in the signal.

The first amplifier 103*a* may amplify the first external signal received from the first external signal reception module 101*a* and remove a noise included in the first external signal. The second amplifier 103*b* may amplify the second external signal received from the second external signal reception module 101*b* and remove a noise included in the second external signal.

The amplifier 103 may transfer the amplified external signal to the signal integration filter 104.

The signal integration filter 104 may integrate a plurality of external signals amplified by the amplifier 103. Particularly, the signal integration filter 104 may receive the amplified first external signal from the first amplifier 103a and the amplified second external signal from the second amplifier 103b and then generate an integrated signal by integrating the amplified first external signal and the amplified second external signal. Further, the signal integration filter 104 may include a high pass filter configured to transmit a high frequency band and a low pass filter configured to transmit a low frequency band. In addition, the signal integration filter 104 may correspond to a diplexer filter.

Therefore, the signal integration filter 104 may integrate signals which have a different frequency band, and then transfer the integrated signal, in which two different signals are integrated, to the controller 220 via the single feeder cable 14.

As mentioned above, the antenna unit 100 may transfer a plurality of signals that is integrated by the signal integration filter 104 to the controller 220. Therefore, it may be possible to transmit and receive a signal between the antenna unit 100 and the controller 220 via the single feeder cable 14 instead of a plurality of feeder cables. In addition, although the single feeder cable 14 is used instead of a plurality of feeder cables, there may be no problem in the communication performance between the antenna unit 100 and the controller 220 and thus the cost of the manufacturing of the vehicle may be reduced.

The controller 220 may include a signal separation filter 221, a first external signal module 222 and a second external signal module 223. The controller 220 may separate the integrated signal, which is generated by the signal integration filter 104, into each signal corresponding to each module by using the signal separation filter 221. The controller 220 may transfer a separated signal to each module corresponding to each signal. In addition, the controller 220 may transfer a control command related to each device in the vehicle to each device in the form of an electrical signal.

The signal separation filter 221 may be electrically connected to the single feeder cable 14, separate an integrated signal received from the signal integration filter 104 into at least two signals, and transfer the separated signal to each module corresponding to the separated signal. Particularly, the signal separation filter 221 may separate an integrated signal generated by the signal integration filter 104 into the amplified first external signal and the amplified second external signal, and transfer the separated signal to each module corresponding to the separated signal.

In other words, the signal separation filter 221 may separate the received integrated signal into the first external signal and the second external signal, and then transfer the first external signal to the first external signal module corresponding to the first external signal and transfer the second external signal to the second external signal module corresponding to the second external signal.

In addition, the signal separation filter 221 may include a high pass filter configured to transmit a high frequency band and a low pass filter configured to transmit a low frequency band. In addition, the signal separation filter 221 may include a diplexer filter.

Therefore, the signal separation filter 221 may separate the integrated signal received via the single feeder cable into two different signals. The separation of the integrated signal may be performed by using a method in which a high frequency band signal is passed through the high pass filter and a low frequency band signal is passed through the low pass filter since a frequency of each signal is relatively different from each other.

The first external signal module 222 may receive the first external signal that is separated from the integrated signal. The first external signal module 222 may output information included in the received signal via the output unit 270 or transfer the information to another device.

For example, when it is assumed that the first external signal is the broadcast communication signal, the first external signal module 222 may receive the broadcast communication signal separated from the integrated signal and transfer the broadcast communication signal to the AVN device 130 corresponding to the broadcast communication signal. The AVN device 130 may receive the broadcast communication signal and output image and sound information included in the broadcast communication signal by using the display panel.

The second external signal module 223 may receive the second external signal that is separated from the integrated signal. The second external signal module 223 may output information included in the received signal by using the output unit 270 or transfer the information to another device.

For example, when it is assume that the second external signal is GPS signals, the second external signal module 223 may receive the GPS signals separated from the integrated signal and transfer the GPS signals to at least one of the AVN device 130, the telematics modem, and the telematics server.

When receiving a signal related to a power supply command from the controller 220 in the form of an electrical signal, the power supplier 240 may supply power to each component of the vehicle 1. Further, the power supplier 240 may directly apply the power to the each component in the vehicle 1 without passing the controller 220. The power supplier 240 may supply the power to the amplifier 103 in the antenna unit 100. Particularly, the power supplier 240 may supply the power to the first amplifier 103a and the second amplifier 103b via the single feeder cable 14. The power that is supplied from the power supplier 240 via the single feeder cable 14 may be the same voltage or a different voltage. The supply of the power may be performed by a phantom feeding method. The supply of the power performed by the phantom feeding method will be described with reference to FIGS. 6 and 7.

The storage unit 250 may store programs for the process and the control of the controller 220, or temporarily store data that is input or output. In addition, the storage unit 250 may store setting information related to the electric device 1000 of the vehicle 1 and update information related to software about the control of the vehicle 1.

The storage unit 250 may include a store medium in at least one type of flash memory type, hard disk type, multimedia card micro type, card memory type (e. g, SD or XD memory), random access memory (RAM), static random access memory (SRAM), read-only memory (ROM), electrically erasable programmable read-only memory (EEPROM), (programmable read-only memory (PROM), magnetic memory, magnetic disk, and optical disk.

The output unit 270 may include a sound output unit 271 and an image output unit 272. The sound output unit 271 may output sound information to a user by using a speaker provided inside of the vehicle. In addition, the image output unit 272 may output image information to a user by using the AVN device 130 and other display units.

Figure 6:
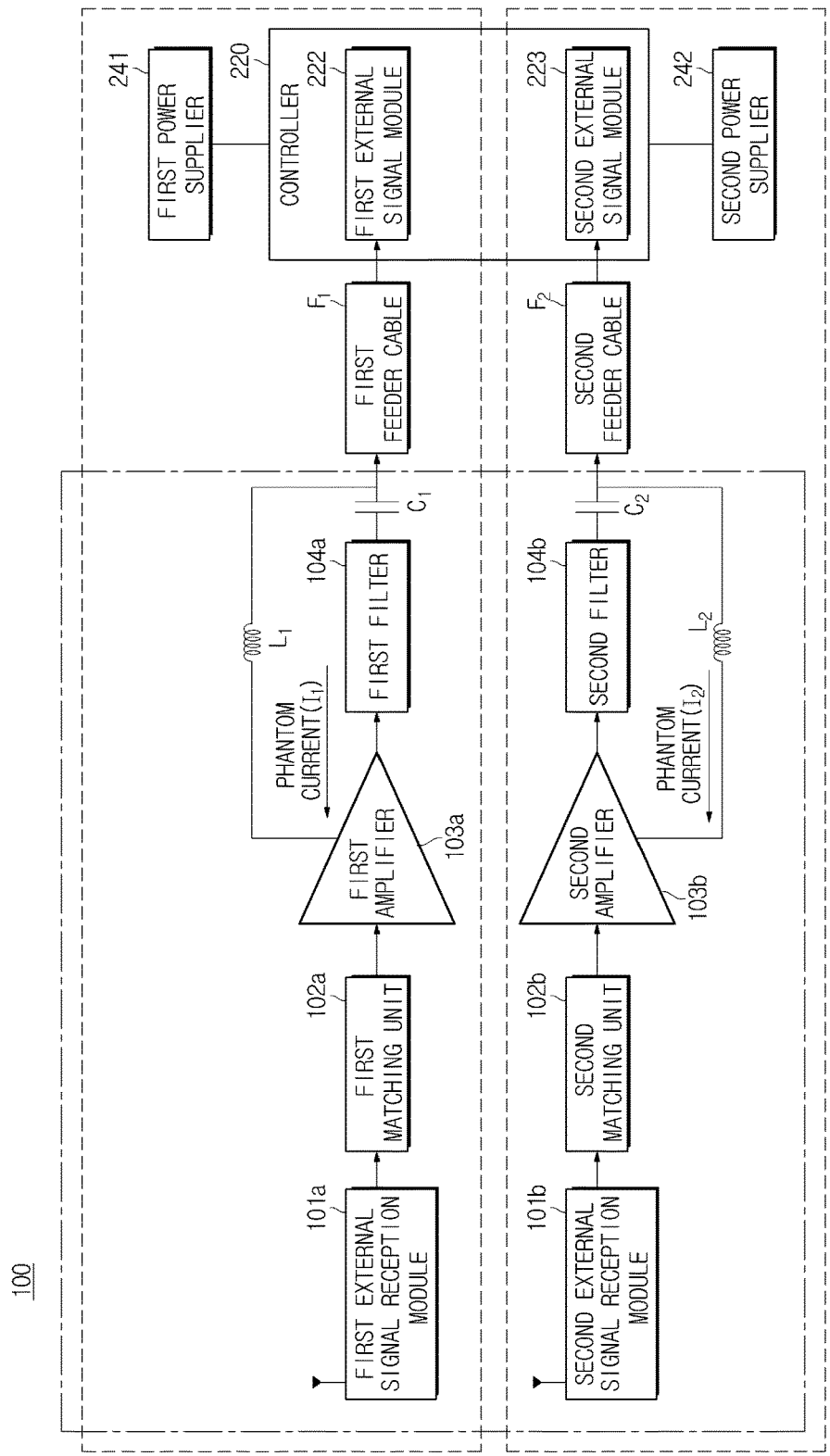
FIG. 6 is a view illustrating a conventional feeder cable connection method in accordance with the embodiment of the present disclosure.
Figure 7:
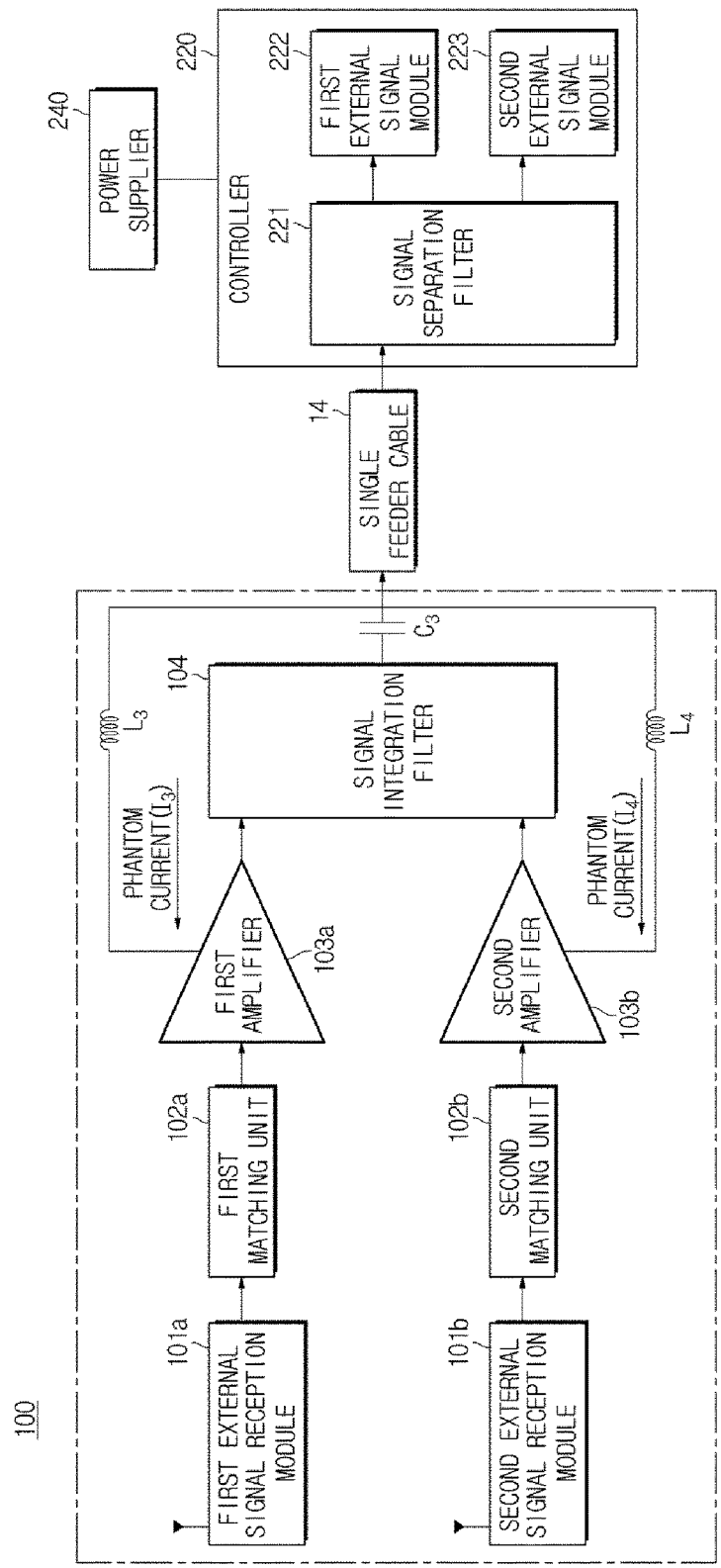
FIG. 7 is a view illustrating a single feeder cable connection method in accordance with the embodiment of the present disclosure.

FIG. 6 is a view illustrating a conventional feeder cable connection method in accordance with the embodiment of the present disclosure. FIG. 7 is a view illustrating a single feeder cable connection method in accordance with the embodiment of the present disclosure. Hereinafter, a difference between the conventional feeder cable connection method and the single feeder cable connection method will be described with reference to FIGS. 6 and 7. In addition, it is assumed that the first external signal is a broadcast communication signal and the second external signal is GPS signals. However, this is for the convenience of the description and thus the external signal is not limited thereto. A description of the same parts as those shown in FIGS. 4 and 5 will be omitted.

In the convention feeder cable connection method, a signal received via the antenna unit 100 may be transferred to each module of the controller 220 by using a plurality feeder cables (F1 and F2).

Particularly, as for a first signal transmission process (A1) and a first power supply process (A1), the first external signal reception module 101*a* may receive the first external signal from the external device. The first external signal may correspond to a broadcast communication signal. The received first external signal may be transferred to the first amplifier 103*a* via the first matching unit 102*a*. Here, the first matching unit 102*a* may match an impedance of the first external signal reception module 101*a* with an impedance of the first amplifier 103*a*.

The first external signal received to the first amplifier 103*a* may be a weak signal or may include a noise. Therefore, the first amplifier 103*a* may remove a noise from the first external signal and amplify a weak signal. Here, the first amplifier 103*a* may include a low noise amplifier (LNA).

The first amplifier 103*a* may receive the power from the power supplier 240 to remove the noise from the first external signal and to amplify the weak signal. The power supplier 240 may supply the power to the first amplifier 103*a* in the phantom feeding method according to the power supply command of the controller 220.

The phantom feeding method may represent a method when supplying a phantom current (11) to the first amplifier 103*a* via the first feeder cable (F1), the power is prevented from being supplied to a first filter unit 104*a* and the power is allowed to be supplied to only the first amplifier 103*a*.

Particularly, the power supplier 240 may supply a Direct Current (DC) power via a DC regulator. In this time, supplying the power to the first filter 104*a* may be stopped by a first capacitor (C1) and then the power may be supplied to the first amplifier 103*a*. The above mentioned performance may be performed by using a principal in which, as for the DC power, the current is stopped by the first capacitor (C1) and a first inductor (L1) transmits the current since the first inductor (L1) does not effect to a circuit.

The first external signal amplified by the first amplifier 103*a* may be transferred to the first filter 104*a*. The first filter 104*a* may include a band-pass filter configured to transmit a frequency in a certain band and the amplified first external signal may be transferred to the first external signal module 222 via the first feeder cable (F1).

A second signal transmission process (A2) and a second power supply process (A2) are the same as the above mentioned first signal transmission process (A1) and first power supply process (A1), and thus, a detail description thereof will be omitted.

As mentioned above, the antenna unit 100 and the controller 220 may transmit and receive a signal or supply or be supplied with power via the first feeder cable (F1) and the second feeder cable (F2) electrically connected to the antenna unit 100 and the controller 220.

Hereinafter, a single feeder cable connection method will be described, but a description of the same parts as those shown in the above will be omitted.

The single feeder cable connection method may represent a method of transmitting and receiving a signal or supplying power by using a single feeder cable when transmitting and receiving a signal or supplying power between the antenna unit 100 and the controller 220.

A power supply method between the antenna unit 100 and the controller 220 will be described.

The first amplifier 103*a* may remove the noise from the first external signal received from the first external signal reception module 101*a* and amplify the first external signal. The first amplifier 103*a* may receive the power from the power supplier 240 to perform removing the noise and amplifying the signal. The second amplifier 103*b* may remove the noise from the second external signal received from the second external signal reception module 101*b* and amplify the second external signal. The second amplifier 103*b* may receive the power from the power supplier 240 to perform removing the noise and amplifying the signal.

The power supplier 240 may simultaneously supply the power to the first amplifier 103*a* and the second amplifier 103*b* via the single feeder cable 14 by using the above mentioned phantom feeding method. The power supplier 240 may supply the phantom power such that the power is prevented from being supplied to the signal integration filter 104 and phantom current (13 and 14) is allowed to flow to the first amplifier 103*a* and the second amplifier 103*b* since the flow of the current is blocked by a third capacitor (C3).

Hereinafter, the transmission and reception of the signal between the antenna unit 100 and the controller 220 will be described.

The single feeder cable connection method may add the signal integration filter 104 while excluding the first filter 104*a* and the second filter 104*b* in comparison with the conventional method.

The signal integration filter 104 may generate an integrated signal by integrating the amplified first external signal received from the first amplifier 103*a* and the amplified second external signal received from the second amplifier 103*b*.

The signal integration filter 104 may transfer the integrated signal to the controller 220 via the single feeder cable 14 in the form of an electrical signal.

The signal separation filter 221 may separate the integrated signal received from the signal integration filter 104 into the first external signal and the second external signal. The signal separation filter 221 may transfer the first external signal to the first external signal module 222 corresponding to the first external signal. The signal separation filter 221 may transfer the second external signal to the second external signal module 223 corresponding to the second external signal.

For example, since the signal separation filter 221 includes the high pass filter and the low pass filter, in a state in which it is assumed that the first external signal is a high frequency band signal, the signal separation filter 221 may transmit the first external signal corresponding to the high frequency band signal by using the high pass filter to separate the first external signal from the second external signal and then transfer the separated first external signal to the first external signal module 222. In addition, in a state in which it is assumed that the second external signal is a low frequency band signal, the signal separation filter 221 may transmit the second external signal corresponding to the low frequency band signal by using the low pass filter to separate the second external signal from the first external signal and then transfer the separated second external signal to the second external signal module 223.

The first external signal module 222 may transmit the first external signal received from the signal separation filter 221 to the output unit 270 or a device in the vehicle. In the same way, the second external signal module 223 may transmit the second external signal received from the signal separation filter 221 to the output unit 270 or a device in the vehicle.

Hereinbefore, the process of transmitting and receiving the signal and supplying the power by using the single feeder cable connected between the antenna unit 100 and the controller 220 has been described.

FIG. 8 is a table illustrating a difference between the plurality of feeder cables connection method and the signal feeder cable connection method in accordance with the embodiment of the present disclosure. FIG. 9 is a table illustrating a process of supplying power according to the signal feeder cable connection method in accordance with the embodiment of the present disclosure.

For the convenience of the description, it is assumed that the above mentioned first external signal module 101a is a GPS module and the above mentioned second external signal module 101b is a broadcast communication module.

When a description is described with respect to a case in which the filter and feeder cable is not integrated and with reference to FIGS. 6 to 8, a first power supplier 241 may reduce an output voltage from a voltage of 5V to a voltage of 4V by passing a low drop out (LDO) switch, and supply a voltage of 4V to the first amplifier (103a of FIG. 6 and a low noise amplifier (LNA) of FIG. 8). In this time, a phantom current (11) supplied via the first feeder cable (F1) may be 50 mA.

A second power supplier 242 may reduce an output voltage from a voltage of 12V to a voltage of 4V by passing a low drop out (LDO) switch, and supply a voltage of 4V to the second amplifier (103b of FIG. 6 and a low noise amplifier (LNA) of FIG. 8). In this time, a phantom current (12) supplied via the second feeder cable (F2) may be 100 mA.

Otherwise, when a description is described with respect to a case in which the filter and feeder cable are integrated and with reference to FIGS. 6 to 8, the first power supplier 241 and the second power supplier 242 may be integrated as the power supplier 240, and the first feeder cable (F1) the second feeder cable (F2) may be integrated as the single feeder cable 14.

After the first power supplier 241 and the second power supplier 242 are integrated as the power supplier 240, the power supplier 240 may reduce an output voltage from a voltage of 5V to a voltage of 4V by passing a low drop out (LDO) switch, and simultaneously supply a voltage of 4V to the first amplifier (103a of FIG. 6 and a low noise amplifier (LNA) of FIG. 8) and the second amplifier (103b of FIG. 6 and a low noise amplifier (LNA) of FIG. 8). In this time, a phantom current (14) supplied via the single feeder cable 14 may be 150 mA. Among 150 mA of the phantom current, 50 mA may be supplied to the first amplifier 103a and 100 mA may be supplied to the second amplifier 103b. Therefore, the function before integrating the feeder cable may be the same as the function after integrating the feeder cable.

However, referring to FIG. 9, before a filter and feeder cable are integrated, the power supplier may be independently provided and thus when any one of the GPS signals or the broadcast communication signal is received, the first power supplier 241 or the second power supplier 242 may be independently operated so that it is possible to supply power corresponding to each signal.

However, after the filter and the feeder cable are integrated, the first power supplier 241 and the second power supplier 242 may be integrated as the single power supplier 240 and thus when any one of the GPS signals or the broadcast communication signal is received, the power supplier 240 may be operated. FIG. 9 illustrates the above mentioned description as a table.

Figure 10:
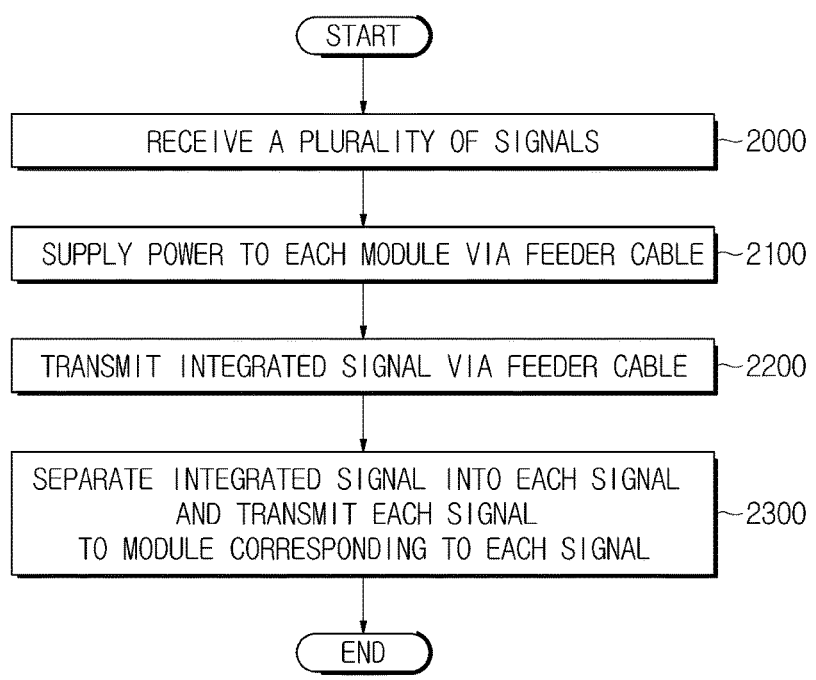
FIG. 10 is a view illustrating a process of transmitting and receiving a signal by using the single feeder cable in accordance with the embodiment of the present disclosure.

FIG. 10 is a view illustrating a process of transmitting and receiving a signal by using the single feeder cable in accordance with the embodiment of the present disclosure.

The antenna unit 100 may receive a plurality of signals from the external device to the vehicle 1 (2000). The plurality of signals may include at least one of GPS signals, broadcast communication signal and RF signal.

For example, a GPS signal reception module of the antenna unit 100 may receive the GPS signals, and a broadcast communication signal reception module of the antenna unit 100 may receive the broadcast communication signal.

The received plurality of signals may include a noise and the signal may be very weak. Therefore, the amplifier 103 may be needed to remove the noise included in the plurality of signals and to amplify the weak signal.

The amplifier 103 may be needed to receive the power from the power supplier 240 to be operated.

Therefore, when the control command of the power supply command of the controller 220 is received, the power supplier 240 may simultaneously supply the power to the first amplifier 103a and the second amplifier 103b via the single feeder cable 14 (2100).

The first amplifier 103a and the second amplifier 103b may receive the power from the power supplier 240. In addition, the first amplifier 103a and the second amplifier 103b may amplify the received signal and then transfer the amplified signal to the signal integration filter 104.

The signal integration filter 104 may generate an integrated signal by integrating the amplified signals received from the first amplifier 103a and the second amplifier 103b. The signal integration filter 104 may transmit the integrated signal to the controller 220 by using the single feeder cable 14 (2200).

The signal separation filter 221 of the controller 220 may separate the integrated signal into each signal (e.g. GPS signals and a broadcast communication signal), and then transfer the each signal to the module (e.g. a GPS module and a broadcast communication module) corresponding to the each signal (2300).

The each module may receive the each signal and then output information included in the each signal by using the output unit 270 and a device in the vehicle.

Hereinabove, the vehicle configured to use the single feeder cable when transmitting and receiving a signal and supplying power between the antenna unit and the controller, and the control method of the vehicle has been described.

As is apparent from the above description, according to the proposed vehicle and method of controlling the same, it may be possible to reduce the vehicle production cost by unifying the feeder cable used for the wireless communication and the power supply between the vehicle antenna and the head unit in the vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents. For example, when the above-mentioned techniques is executed in a different order from the above-mentioned method, and/or the above-mentioned components such as system, structure, device and circuit is coupled or combined in a manner different from the above-mentioned method or is replaced or substituted by other components or equivalents, the similar result may be achieved.

What is claimed is:

1. A vehicle comprising:
an antenna receiving at least two external signals from an external device and generating and outputting an integrated signal by integrating the at least two external signals, the antenna including a signal integration filter;
a single feeder cable electrically connected to the antenna and configured to transfer the integrated signal;
a controller electrically connected to the single feeder cable, separating the integrated signal into at least two signals, and transferring the at least two signals to each module corresponding to each of the at least two signals, the controller including a signal separation filter; and
a power supplier supplying power to the antenna through the single feeder cable,
wherein the antenna further comprises:
a first amplifier amplifying a first external signal;
a second amplifier amplifying a second external signal; and
a capacitor disposed between the single feeder cable and the signal integration filter, and
wherein the capacitor cuts off the power supplied from the power supplier to the signal integration filter, and the power supplier supplies the power to the first amplifier and the second amplifier in a phantom feeding manner.

2. The vehicle of claim 1, wherein
the single feeder cable connects a port of the antenna to a port of the controller and transfers the integrated signal between the antenna and the controller.

3. The vehicle of claim 1, wherein
the antenna comprises a first external signal reception module configured to receive the first external signal and a second external signal reception module configured to receive the second external signal that is different from the first external signal.

4. The vehicle of claim 1, wherein
the power supplier supplies the same voltage to the first amplifier and the second amplifier.

5. The vehicle of claim 1, wherein
the signal integration filter generates the integrated signal by integrating the amplified first external signal and the amplified second external signal.

6. The vehicle of claim 5, wherein
the signal integration filter comprises a high pass filter and a low pass filter.

7. The vehicle of claim 5, wherein
the signal separation filter separates the integrated signal generated by the signal integration filter into a signal corresponding to the amplified first external signal and a signal corresponding to the amplified second external signal, and transfers each of the signal to each module corresponding to each of the signal.

8. The vehicle of claim 7, wherein
the signal separation filter comprises a high pass filter and a low pass filter.

9. The vehicle of claim 1, wherein
the at least two signals comprises at least one of a broadcast communication signal and GPS signals.

10. A method of controlling a vehicle, the method comprising:
receiving, by an antenna, at least two external signals from an external device;
outputting, by the antenna, an integrated signal by integrating the at least two external signals;
transferring, by a single feeder cable, the integrated signal;
separating, by a controller, the integrated signal received via the single feeder cable into at least two signals via a single separation filter;
transferring, by the controller, the at least two signals to each module corresponding to each of the at least two signals; and
supplying power via the single feeder cable,
wherein the antenna comprises:
a first amplifier amplifying a first external signal;
a second amplifier amplifying a second external signal; and
a capacitor disposed between the single feeder cable and a signal integration filter, wherein the supplying power comprises:
cutting off, by the capacitor, the power supplied to the signal integration filter; and
supplying the power to the first amplifier and the second amplifier in a phantom feeding manner.

11. The method of claim 10, wherein
the single feeder cable connects a connection port of the antenna to a connection port of the controller.

12. The method of claim 10, wherein
the transferring the integrated signal via the single feeder cable comprises transmitting the integrated signal including a radio frequency (RF) signal.

13. The method of claim 10, wherein
the receiving the at least two external signal from the external device comprises receiving the first external signal and receiving the second external signal that is different from the first external signal.

14. The method of claim 13, wherein
the outputting the integrated signal by integrating the at least two external signals comprises amplifying the first external signal and amplifying the second external signal.

15. The method of claim 14, wherein
the outputting the integrated signal by integrating the at least two external signals comprises generating the integrated signal by integrating the amplified first external signal and the amplified second external signal.

16. The method of claim 15, wherein
the separating the integrated signal received via the single feeder cable into at least two signals and the transferring the at least two signal to each module corresponding to each of the at least two signals comprises:
separating the integrated signal into a signal corresponding to the amplified first external signal and a signal corresponding to the amplified second external signal; and transferring each of the signal to each module corresponding to each of the signal.

17. The method of claim 10, wherein
the at least two signals comprises at least one of a broadcast communication signal and GPS signals.

* * * * *